US010430687B2

United States Patent
Xu

(10) Patent No.: US 10,430,687 B2
(45) Date of Patent: Oct. 1, 2019

(54) TRADEMARK GRAPH ELEMENT IDENTIFICATION METHOD, APPARATUS AND SYSTEM, AND COMPUTER STORAGE MEDIUM

(71) Applicant: Qing Xu, Guangdong (CN)

(72) Inventor: Qing Xu, Guangdong (CN)

( * ) Notice: Subject to any disclaimer, the term of this patent is extended or adjusted under 35 U.S.C. 154(b) by 0 days.

(21) Appl. No.: 16/062,001

(22) PCT Filed: Mar. 8, 2016

(86) PCT No.: PCT/CN2016/075871
§ 371 (c)(1),
(2) Date: Aug. 27, 2018

(87) PCT Pub. No.: WO2017/101225
PCT Pub. Date: Jun. 22, 2017

(65) Prior Publication Data
US 2018/0373960 A1    Dec. 27, 2018

(30) Foreign Application Priority Data
Dec. 15, 2015    (CN) .......................... 2015 1 0945834

(51) Int. Cl.
*G06K 9/32*    (2006.01)
*G06K 9/62*    (2006.01)
(Continued)

(52) U.S. Cl.
CPC ........... *G06K 9/6215* (2013.01); *G06F 16/00* (2019.01); *G06F 16/583* (2019.01);
(Continued)

(58) Field of Classification Search
CPC .. G06K 9/3241; G06K 9/4604; G06K 9/6202; G06K 9/6215
See application file for complete search history.

(56) References Cited

U.S. PATENT DOCUMENTS

| 5,524,182 | A | * | 6/1996 | Chari | G06F 17/214 |
| | | | | | 358/1.11 |
| 6,134,340 | A | * | 10/2000 | Hsu | G06K 9/00087 |
| | | | | | 382/124 |

(Continued)

FOREIGN PATENT DOCUMENTS

| CN | 101464951 A | 6/2009 |
| CN | 101727580 A | 6/2010 |

(Continued)

OTHER PUBLICATIONS

Alwis ("Content-based Retrieval of Trademark Images," PhD dissertation, University of New York, Feb. 2000. Downloaded from https://www.cs.york.ac.uk/arch/publications/theses/sujeewa.alwis.pdf-1/at_download/sujeewa.alwis (Year: 2000).*

(Continued)

*Primary Examiner* — Yubin Hung
(74) *Attorney, Agent, or Firm* — Hamre, Schumann, Mueller & Larson, P.C.

(57) ABSTRACT

A method for automatically dividing trademark figurative element codes is disclosed, including: establishing a sample trademark library and establishing a corresponding relationship between sample trademarks and division data for figurative element codes of known filed/registered figurative trademarks; extracting and processing image feature information of the sample trademarks, and establishing a corresponding relationship between the sample trademarks and the extracted image feature information; extracting and processing image feature information of a trademark to be identified; performing a matching retrieval by taking the image feature information of the trademark to be identified as a retrieval condition, and finding out a sample trademark with a highest similarity degree to the image feature information of the trademark to be identified, and a corresponding trademark figurative element code; outputting the trade- (Continued)

mark figurative element code corresponding to the sample trademark with a highest similarity degree to the image feature information of the trademark to be identified as a figurative element code of the trademark to be identified. By means of the method, the trademark figurative element codes of a figurative trademark can be automatically divided.

11 Claims, 6 Drawing Sheets

(51) Int. Cl.
  *G06K 9/46* (2006.01)
  *G06F 16/00* (2019.01)
  *G06F 16/583* (2019.01)
(52) U.S. Cl.
  CPC ......... *G06K 9/3241* (2013.01); *G06K 9/4604* (2013.01); *G06K 9/6202* (2013.01)

(56) References Cited

U.S. PATENT DOCUMENTS

| | | | | |
|---|---|---|---|---|
| 6,801,661 | B1 * | 10/2004 | Sotak | G06K 9/482 382/203 |
| 6,819,782 | B1 * | 11/2004 | Imagawa | G06K 9/00355 382/115 |
| 8,892,594 | B1 | 11/2014 | Khafizov | |
| 9,058,543 | B2 | 6/2015 | Campbell et al. | |
| 2005/0025357 | A1 * | 2/2005 | Landwehr | A01M 1/026 382/170 |
| 2006/0045312 | A1 * | 3/2006 | Bernstein | A63B 24/0003 382/103 |
| 2007/0071325 | A1 * | 3/2007 | Lin | G06K 9/4642 382/199 |
| 2010/0104194 | A1 * | 4/2010 | Suzuki | G06K 9/4647 382/195 |
| 2010/0246978 | A1 * | 9/2010 | Makihara | G03F 1/36 382/218 |
| 2010/0253622 | A1 * | 10/2010 | Makita | A63F 13/04 345/158 |
| 2013/0322772 | A1 | 12/2013 | Seo et al. | |

FOREIGN PATENT DOCUMENTS

| | | | | |
|---|---|---|---|---|
| CN | 101894154 | A | | 11/2010 |
| CN | 102541954 | A * | | 7/2012 |
| CN | 103258037 | A | | 8/2013 |
| CN | 104156413 | A | | 11/2014 |
| CN | 104199931 | A | | 12/2014 |
| CN | 104298990 | A | | 1/2015 |
| CN | 104462380 | A | | 3/2015 |
| CN | 104680393 | A * | | 6/2015 |
| CN | 104809142 | A | | 7/2015 |
| EP | 0156343 | A2 | | 10/1985 |
| WO | WO-2014000261 | A1 * | 1/2014 | ............. G06K 9/325 |

OTHER PUBLICATIONS

Mehrotra et al. ("Similar-shape retrieval in shape data management," IEEE Computer, vol. 28 , Is. 9 , Sep. 1995, pp. 57-62) (Year: 1995).*
Alwis ("Content-based Retrieval of Trademark Images," PhD dissertation, University of New York, Feb. 2000. Downloaded from https://www.cs.york.ac.uk/arch/publications/theses/sujeewa.alwis.pdf-1/at_download/sujeewa.alwis (Year: 2000).*
Mehrotra et al. ("Similar-shape retrieval in shape data management," IEEE Computer, vol. 28 , Is. 9 , Sep. 1995, pp. 57-62) (Year: 1995).*
Patel et al. ("Preprocessing and Similarity Matching Trademark Images Based on Color and Shape," International Journal of Science and Research, vol. 4, Is. 1, Jan. 2015) (Year: 2015).*
Jain et al. ("Shape-Based Retrieval: A Case Study with Trademark Image Databases," Pattern Recognition, vol. 31, No. 9, 1998, pp. 1369-1390) (Year: 1998).*
Phan et al. ("Content-based retrieval of logo and trademarks in unconstrained color image databases using Color Edge Gradient Co-occurrence Histograms," Computer Vision and Image Understanding 114(1), Jan. 2010) (Year: 2010).*
Qi et al. ("An Effective Solution for Trademark Image Retrieval by Combining Shape Description and Feature Matching", Pattern Recognition 43,2010) (Year: 2010).*
International Search Report issued for International Patent Application No. PCT/CN2016/075871, dated Sep. 22, 2016, 6 pages including English translation.
First Office Action and Search Report issued for Chinese Patent Application No. 201510945834.4, 16 pages including English translation.
Second Office Action issued for Chinese Patent Application No. 201510945834.4, 12 pages including English translation.
Song et al., "Trademark Retrieval Algorithm Based on Combination of Boundary and Region Features," Journal of Software, Dec. 2012, vol. 23, Supplement (2), pp. 85-93, China (with English abstract).
Office Action issued for British Patent Application No. GB1811592.3, dated Sep. 18, 2018, 3 pages.

* cited by examiner

TRADEMARK GRAPH ELEMENT IDENTIFICATION METHOD, APPARATUS AND SYSTEM, AND COMPUTER STORAGE MEDIUM

FIELD

The present disclosure relates to a field of trademark information retrieval, and more particularly, to a method, a device, and a system for automatically dividing trademark figurative element codes, and a computer storage medium.

BACKGROUND

Trademark retrieval is important for procedures of application for trademark registration, trademark examination, trademark management, and right protection of trademark and so on. The retrieval purpose is realized substantively by manually inputting a trademark figurative element code as a retrieval condition in a traditional figurative trademark retrieval. The trademark figurative element code is a dividing tool for trademark figurative element generated based on the *Vienna Agreement for Establishing an International Classification of the Figurative Elements of Marks*, which is consisted of a list of trademark figurative elements classified by major categories, subcategories, and groups, including a number of the trademark figurative element and a name of the trademark figurative element. Therefore, each of the trademark figurative element codes represents the content and meaning of the trademark figurative element.

Nowadays, the trademark figurative element codes are divided manually, which is generally undertaken by minority examiners with professional level of trademark figurative element codes in the national trademark management institution in the world, basically without intelligentized tools or means. Although division task of the trademark figurative element codes can be performed based on the present manual division method for the trademark figurative element codes, there are obvious defects and drawbacks, mainly reflecting in the following.

1) Low working efficiency of division and huge consumption of working energy is obvious to the manual division of the trademark figurative element codes.

2) Strong professionality is required for the division of the trademark figurative element codes, and common staffs cannot easily to exactly master the method for the trademark figurative element codes, which restricting the widely use of the figurative trademark retrieval.

3) Even the trademark figurative element codes are divided by professionals, there are differences existing in the meaning of the trademark figure determined subjectively by different professionals, which would results to inconformity of the trademark figurative element codes.

SUMMARY

Based on the above, a method, a device and a system for automatically dividing trademark figurative element codes, and a computer storage medium are provided in present disclosure. Automated and standardized identification of the trademark figurative element code can be realized, by performing analysis by using big data resource for division of figurative element codes of known filed/registered figurative trademarks, obtaining a sample trademark with a highest overlapping degree of feature information and a figurative element code recorded thereof by a matching retrieval between image feature information of a trademark to be identified and image feature information of sample trademarks, and taking the figurative element code of the sample trademark as a figurative element code of the trademark to be identified.

According to one aspect of the present disclosure, a method for automatically dividing trademark figurative element codes is provided, including: S101, establishing a sample trademark library and establishing a corresponding relationship between sample trademarks and division data for figurative element codes of known filed/registered figurative trademarks; S102, extracting and processing image feature information of the sample trademarks, and establishing a corresponding relationship between the sample trademarks and the extracted image feature information, specifically including extracting a coordinate value $G_n(x_n, y_n)$, a relative coordinate value $S_n(x_n, y_n)$ and a rounded relative coordinate value $Z_n(x_n, y_n)$ of a pixel in a contour feature line of a sample trademark image to obtain the image feature information of the sample trademark; S103, extracting and processing image feature information of a trademark to be identified, specifically including extracting a coordinate value $G_n(x_n, y_n)$, a relative coordinate value $S_n(x_n, y_n)$ and a rounded relative coordinate value $Z_n(x_n, y_n)$ of a pixel in a contour feature line of a trademark image to be identified to obtain the image feature information of the trademark to be identified; S104, performing a matching retrieval by taking the image feature information of the trademark to be identified as a retrieval condition, and finding out a sample trademark with a highest similarity degree to the image feature information of the trademark to be identified, and a corresponding trademark figurative element code, specifically including performing the matching retrieval in the sample trademark library by taking the image feature information of the rounded relative coordinate value $Z_n(x_n, y_n)$ of the pixel in the contour feature line of the trademark image to be identified as a retrieval keyword, and respectively finding out a number of pixels matched with the rounded relative coordinate value $Z_n(x_n, y_n)$ of the pixel in the contour feature line of the trademark image to be identified and a number of pixels mismatched with the rounded relative coordinate value $Z_n(x_n, y_n)$ of the pixel in the contour feature line of the trademark image to be identified, to find out the sample trademark with a highest similarity degree to the image feature information of the trademark to be identified, and the corresponding trademark figurative element code; and S105, outputting the trademark figurative element code corresponding to the sample trademark with a highest similarity degree to the image feature information of the trademark to be identified as a figurative element code of the trademark to be identified.

According to another aspect of the present disclosure, a device for automatically dividing trademark figurative element codes is provided, comprising: a sample trademark library establishing module, configured to establish a sample trademark library and establish a corresponding relationship between sample trademarks and division data for figurative element codes of known filed/registered figurative trademarks; a sample trademark image feature information extraction module, configured to extract and process image feature information of the sample trademarks, and establish a corresponding relationship between the sample trademarks and the extracted image feature information, specifically configured to extract a coordinate value $G_n(x_n, y_n)$, a relative coordinate value $S_n(x_n, y_n)$ and a rounded relative coordinate value $Z_n(x_n, y_n)$ of a pixel in a contour feature line of a sample trademark image to obtain the image feature information of the sample trademark; an image feature information extraction module for a trademark to be identified, configured to extract and process image feature information of a trademark to be identified, specifically configured to extract a coordinate value $G_n(x_n, y_n)$, a relative coordinate value $S_n(x_n, y_n)$ and a rounded relative coordinate value $Z_n(x_n, y_n)$ of a pixel in a contour feature line of a trademark image to be identified to obtain the image feature information of the trademark to be identified; a matching retrieval module, configured to perform a matching retrieval by taking the image feature information of the trademark to be identified as a retrieval condition, and find out a sample trademark with a highest similarity degree to the image feature information of the trademark to be identified, and a corresponding trademark figurative element code, specifically configured to perform the matching retrieval in the sample trademark library by taking the image feature information of the rounded relative coordinate value $Z_n(x_n, y_n)$ of the pixel in the contour feature line of the trademark image to be identified as a retrieval keyword, and respectively finding out a number of pixels matched with the rounded relative coordinate value $Z_n(x_n, y_n)$ of the pixel in the contour feature line of the trademark image to be identified and a number of of pixels mismatched with the rounded relative coordinate value $Z_n(x_n, y_n)$ of the pixel in the contour feature line of the trademark image to be identified, to find out the sample trademark with a highest similarity degree to the image feature information of the trademark to be identified, and the corresponding trademark figurative element code; a figurative element code outputting module, configured to output the trademark figurative element code corresponding to the sample trademark with a highest similarity degree to the image feature information of the trademark to be identified as a figurative element code of the trademark to be identified.

According to a further aspect of the present disclosure, a system for automatically dividing trademark figurative element codes is provided, comprising a memory and a server, wherein the memory and the server are configured to perform following operations: establishing a sample trademark library and establishing a corresponding relationship between sample trademarks and division data for figurative element codes of known filed/registered figurative trademarks; extracting and processing image feature information of the sample trademarks, and establishing a corresponding relationship between the sample trademarks and the extracted image feature information, specifically including extracting a coordinate value $G_n(x_n, y_n)$, a relative coordinate value $S_n(x_n, y_n)$ and a rounded relative coordinate value $Z_n(x_n, y_n)$ of a pixel in a contour feature line of a sample trademark image to obtain the image feature information of the sample trademark; extracting and processing image feature information of a trademark to be identified, specifically including extracting a coordinate value $G_n(x_n, y_n)$, a relative coordinate value $S_n(x_n, y_n)$ and a rounded relative coordinate value $Z_n(x_n, y_n)$ of a pixel in a contour feature line of a trademark image to be identified to obtain the image feature information of the trademark to be identified; performing a matching retrieval by taking the image feature information of the trademark to be identified as a retrieval condition, and finding out a sample trademark with a highest similarity degree to the image feature information of the trademark to be identified, and a corresponding trademark figurative element code, specifically including performing the matching retrieval in the sample trademark library by taking the image feature information of the rounded relative coordinate value $Z_n(x_n, y_n)$ of the pixel in the contour feature line of the trademark image to be identified as a retrieval keyword, and respectively finding out a number of pixels matched with the rounded relative coordinate value $Z_n(x_n, y_n)$ of the pixel in the contour feature line of the trademark image to be identified and a number of pixels mismatched with the rounded relative coordinate value $Z_n(x_n, y_n)$ of the pixel in the contour feature line of the trademark image to be identified, to find out the sample trademark with a highest similarity degree to the image feature information of the trademark to be identified, and the corresponding trademark figurative element code; outputting the trademark figurative element code corresponding to the sample trademark with a highest similarity degree to the image feature information of the trademark to be identified as a figurative element code of the trademark to be identified.

According to a further aspect of the present disclosure, a storage medium containing computer readable program is provided, wherein when the computer readable program in the storage medium is executed, the above method for automatically dividing trademark figurative element codes is performed.

In an embodiment of the present disclosure, the big data resource for the division of the figurative element codes of the known filed/registered figurative trademarks are used, and the trademark figurative element codes are learned and automatically divided by the system, which provides the standardizing identification for the division of the trademark figurative element codes, to solve the problem that differences are existed due to the subjective division of different professionals formerly. Compared with the traditional manual division of the trademark figurative element codes, the embodiment of the present disclosure has advantages of a high working efficiency and saying working energy, which solves the drawback that the traditional trademark figurative element codes are only divided by manual work, causing the low working efficiency and huge consumption of working energy. In the embodiment of the present disclosure, requirement for the professional level of the trademark figurative element codes of the trademark retrieval staffs is lowered, which is benefit to using the trademark retrieval technique of the trademark figurative element codes in a wider field, so that the technical defects and limitation of the division only based on the manual work, the division standard being difficult to unify, and the existing differences due to the subjective division of the traditional trademark figurative element codes are overcome, and the object for the automatic identification and standardizing identification of the trademark figurative element codes is realized effectively.

DETAILED EMBODIMENTS

The technical solution of the present disclosure will be described in detail below by reference to the following embodiments combined with the attached figures.

Figure 1:
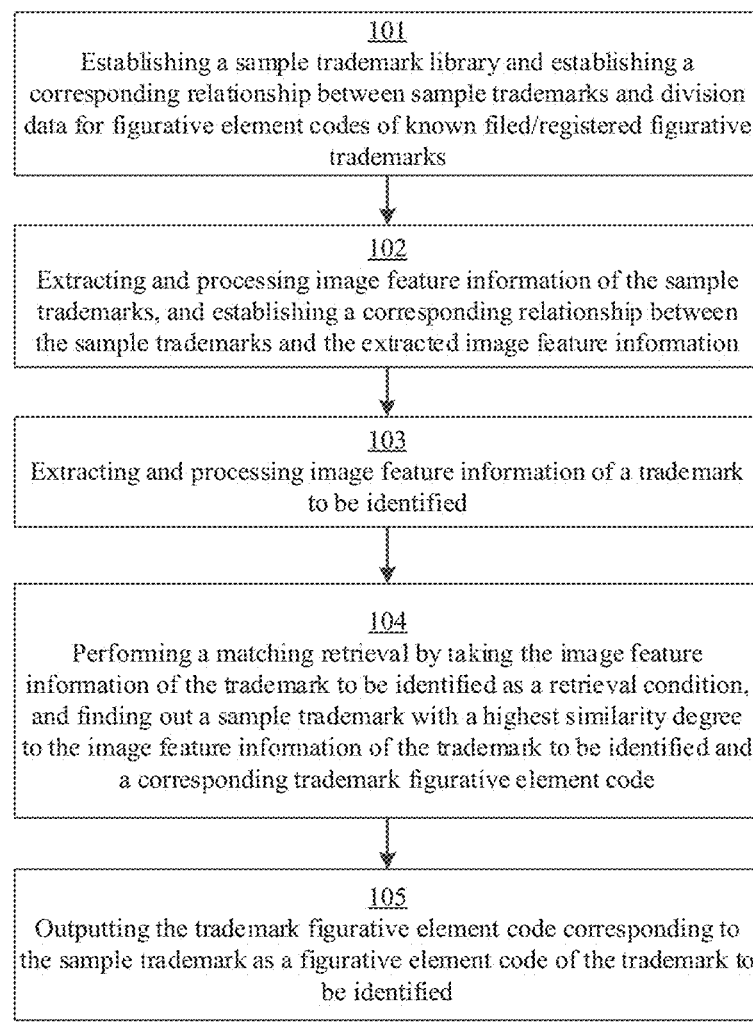
FIG. 1 is a flow diagram of a method for automatically dividing trademark figurative element codes according to an embodiment of the present disclosure.

FIG. 1 illustrates a flow diagram of a method for automatically dividing trademark figurative element codes according to an embodiment of the present disclosure. The method includes the following steps:

S101, establishing a sample trademark library and establishing a corresponding relationship between sample trademarks and division data for figurative element codes of known filed/registered figurative trademarks;

S102, extracting and processing image feature information of the sample trademarks, and establishing a corresponding relationship between the sample trademarks and the extracted image feature information;

S103, extracting and processing image feature information of a trademark to be identified;

S104, performing a matching retrieval by taking the image feature information of the trademark to be identified as a retrieval condition, and finding out a sample trademark with a highest similarity degree to the image feature information of the trademark to be identified, and a corresponding trademark figurative element code; and S105, outputting the trademark figurative element code corresponding to the sample trademark as a figurative element code of the trademark to be identified.

Each step above will be described in detail below.

Firstly, a sample trademark library is established and a corresponding relationship between sample trademarks and division data for figurative element codes of known filed/registered figurative trademarks is established.

Figure 2:
FIG. 2 is a diagram illustrating original images of some exemplary images according to an embodiment of the present disclosure.

FIG. 2 shows images of some sample trademarks randomly provided. In an embodiment of the present disclosure, the sample trademark library is to be established, and the division data for the figurative element codes of the known filed/registered figurative trademarks is used to record figurative element code information of the sample trademarks in the sample trademark library.

The trademark figurative element code is a division tool for the trademark figurative elements generated based on the *Vienna Agreement for Establishing an International Classification of the Figurative Elements of Marks*, which is consisted of a list of trademark figurative elements classified by major categories, subcategories and groups, including a number of the trademark figurative element and a name of the trademark figurative element.

Secondly, an image feature of the sample trademark is identified and processed, and image feature information thereof is extracted.

The purpose of identifying and processing the image feature of the sample trademark and extracting the image feature information thereof is to find out a same or most similar trademark by matching of the image feature information.

Since an image contour line extracted by a Teh-Chin detection algorithm in a polygonal approximation method can better reflect a distinctiveness of a trademark. The-Chin detection algorithm in the polygonal approximation method is used in this technical solution to extract feature information of a key pixel in the sample trademark image, i.e. coordinate values of the pixels in a contour feature line of the sample trademark image.

The feature information of the key pixel in the sample trademark image can also be extracted by other known technical methods, including extracting framework feature information, extracting shape feature information, extracting template feature information and so on.

In an embodiment of the present disclosure, the process of identifying and processing the image feature of the sample trademark and extracting the image feature information thereof is described below.

① At least one of following preprocessing including graying, binarization, and denoising is performed for the sample trademark.

A grayscale digital image is an image with only one sampled color in each pixel. Such image is generally displayed in grayscale from the darkest black to the brightest white, although theoretically the sampling can be different shades of any color, and even can be different color with different brightness. The grayscale image is different from a black-and-white image. In the field of computer image, the black-and-white image only has two colors of black and white, and the grayscale image may include many levels of color depth between black and white.

Image binarization refers to set a gray value of a pixel in an image to 0 or 255, that is, the whole image would present an obvious black-and-white effect.

Noise mainly refers to a rough part in an image generated in a process that light is taken as a received signal and output by a charge coupling device (CCD), or refers to an extra pixel which should not present in the image and is generally generated by electronic interference. It looks like that the image is tainted, and covered with some tiny, rough spots. For a common digital photograph with high-definition, if it is shrunk by a personal computer, the noise is easy to be ignored. However, if the original image is enlarged, a color (false color) which was not existed originally may present. Such false color is the noise of the image, which can be removed by technical means.

② A contour feature line is extracted from a grayed, binarized, and denoised sample trademark image, and the contour feature line includes an outer contour line and an inner contour line of the sample trademark image.

Figure 3:
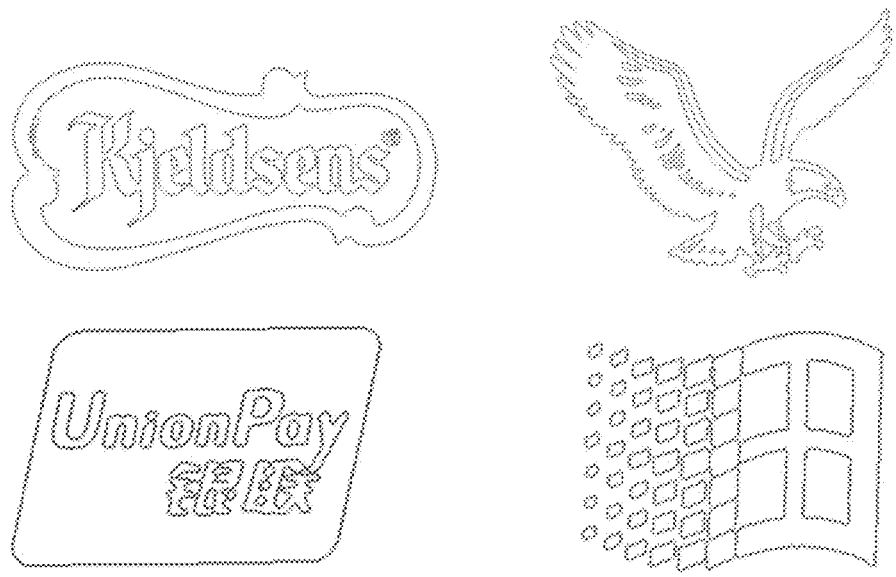
FIG. 3 is a diagram illustrating exemplary contour feature lines according to an embodiment of the present disclosure.

In an embodiment of the present disclosure, the polygonal approximation method is used to extract the feature of a key pixel in the image, i.e. the contour feature line. The contour feature line is a set of pixels in the contour line, which can generate a sequence image of the pixels in the contour feature line of the sample trademark image. FIG. 3 shows contour feature lines of some images. It can be seen that, the contour feature lines include pixels in the outer contour lines and pixels in the inner contour lines. The pixels are original features which are inherent in the image.

③ A direction and an extracting rectangle are positioned for the contour feature line in a coordinate system.

The positioning of the direction and the extracting rectangle of the contour feature line refers to uniquely position a direction and an extracting rectangle by a certain method for a placement position of the contour feature line.

In a practical application, the specific purpose of positioning a direction refers to that: in order to realize comparability in a direction for pixels in contour feature lines of different images, the sample trademark images should be placed in a positioning position with a uniform direction, solving problems of the comparability and uniqueness when there is a deformation or a difference in the direction or angle of the images. Thus the coordinate values of the images can be exactly extracted in the coordinate system, realizing the comparability of the coordinate values of the same or similar images.

In a practical application, the purpose of positioning an extracting rectangle refers to that: in order to realize comparability in an extracting rectangle of pixels in contour feature lines of different images, the sample trademark images should be placed in an extracting rectangle, solving problems of integrity of scope of the image identification and the comparability and uniqueness when there is a deformation or a difference in size, shape, or position of the images. Thus the integrated coordinate values of the images can be exactly extracted in the coordinate system, realizing the comparability of the coordinate values of the same or similar images in terms of integrity.

Specifically, in an embodiment of the present disclosure, a reference positioning method is used to realize the above purposes. The reference positioning includes natural reference positioning and reference straight line positioning. Only one positioning standard can be chosen in a same processing system, otherwise the comparability may be destroyed.

Figure 4:
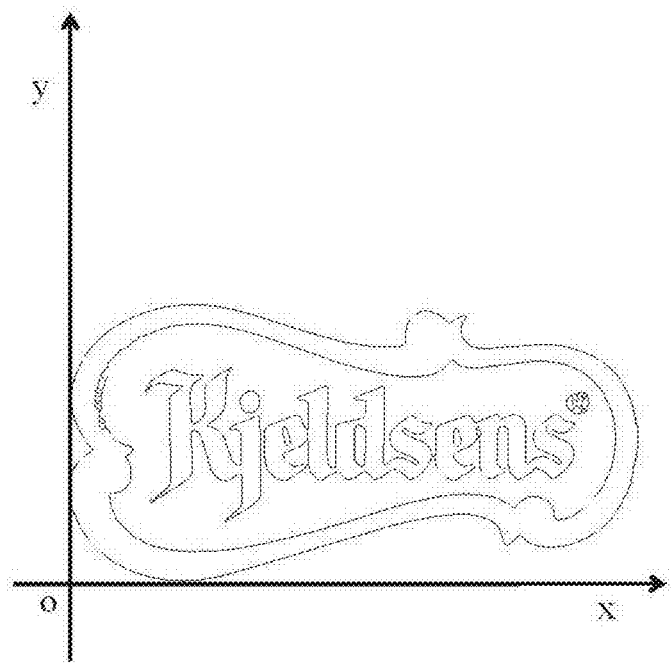
FIG. 4 is a diagram illustrating positioning of a direction based on natural reference positioning according to an embodiment of the present disclosure.
Figure 5:
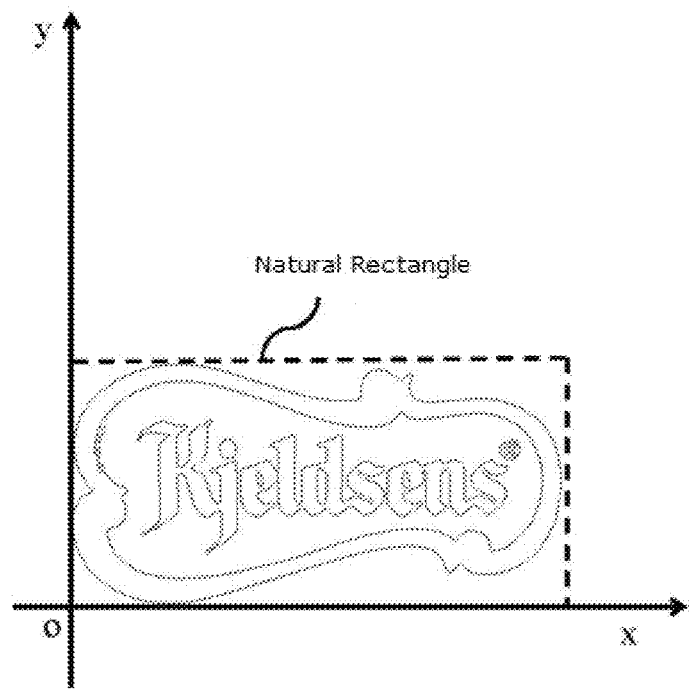
FIG. 5 is a diagram illustrating positioning of an extracting rectangle based on natural reference positioning according to an embodiment of the present disclosure.

FIG. 4 illustrates key points for positioning a direction based on the natural reference positioning. FIG. 5 illustrates key points for positioning an extracting rectangle based on the natural reference positioning, when the extracting rectangle is a circumscribed rectangle. The natural reference positioning refers to translate the contour feature line of the sample trademark image without changing a rotating direction to a coordinate system in which the pixels in the contour feature line of the sample trademark image have a minimum coordinate value of 0 on an x axis and a minimum coordinate value of 0 on a y axis. The advantages of using the natural reference positioning can be simple, and easy for quick positioning.

Figure 6:
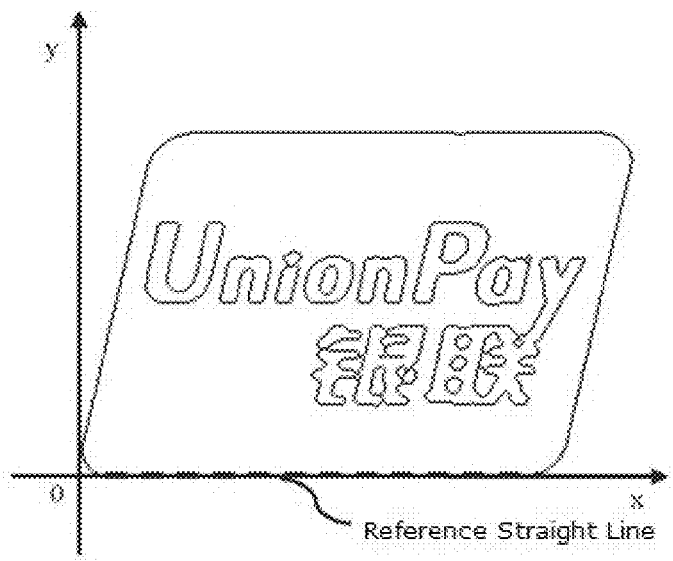
FIG. 6 is a diagram illustrating positioning of a direction based on reference straight line positioning according to one embodiment of the present disclosure.
Figure 7:
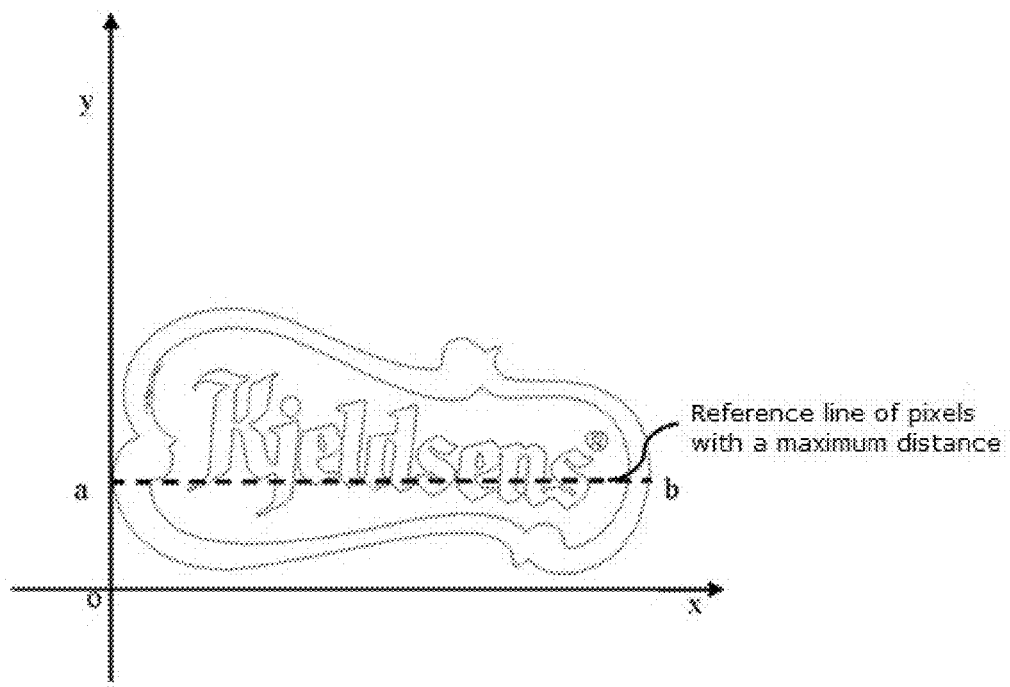
FIG. 7 is a diagram illustrating positioning of a direction based on reference straight line positioning according to another embodiment of the present disclosure.
Figure 8:
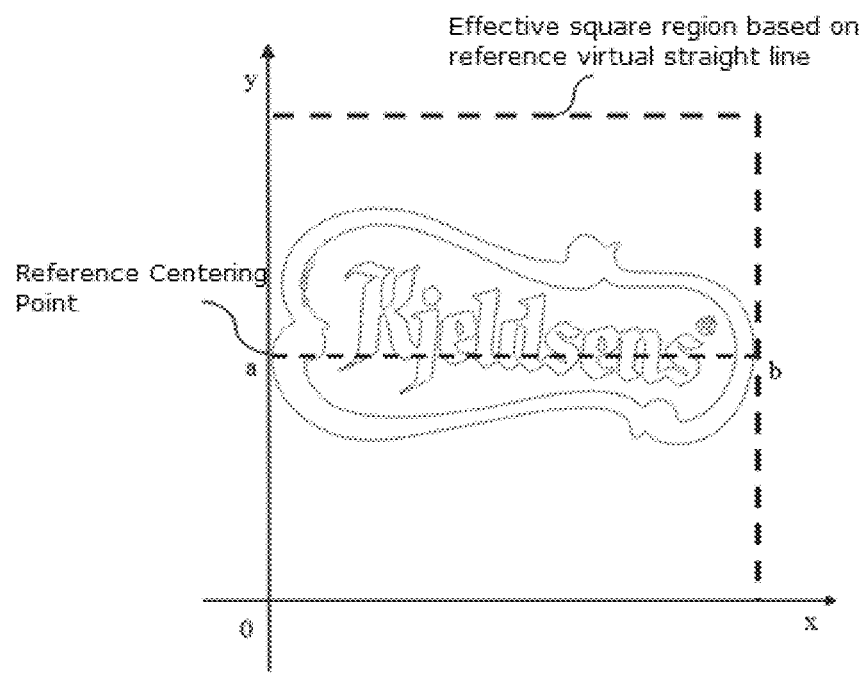
FIG. 8 is a diagram illustrating positioning of an extracting rectangle based on reference straight line positioning according to an embodiment of the present disclosure.

FIG. 6 and FIG. 7 illustrate key points for positioning a direction based on the reference straight line positioning. FIG. 8 illustrates key points for positioning an extracting rectangle based on the reference straight line positioning, when the extracting rectangle is a circumscribed square. The reference straight line positioning refers to find out a positioning straight line in the contour feature line of the sample trademark image, and translate the contour feature line of the sample trademark image at a minimum rotating angle until the positioning straight line is parallel to an x axis or a y axis (parallel to an x axis in this embodiment), and the pixels in the contour feature line of the sample trademark image have a minimum coordinate value of 0 on the x axis, and the contour feature line of the sample trademark image is aligned to and centered on the y axis inside the extracting rectangle. The advantages of using the reference straight line positioning are that precise positioning is realized and a good and unique positioning reference for images placed at different angles or irregular images is provided.

Processes based on the reference straight line positioning in different cases are described below.

1. The reference straight line positioning is used to position a direction. Firstly, arrangement of the pixels in the contour feature line of the sample trademark image is detected to determine whether there is a straight line feature. If there is a straight line feature, find out a longest straight line in the outer contour line, and then the contour feature line of the sample trademark image is rotated at a minimum rotating angle so that the longest straight line in the outer contour line is parallel to the x axis or the y axis, that is, it can be confirmed that the contour feature line is positioned in a direction. FIG. 6 illustrates an embodiment in which the longest straight line in the outer contour line is used for positioning a direction.

If there are two or more than two longest straight lines in the outer contour line when positioning a direction, the straight line that can be rotated at a minimum rotating angle to be parallel to the x axis or the y axis of the longest straight lines in the outer contour line is chosen as a reference straight line.

If there is no straight line feature in the arrangement of the pixels in the contour feature line of the sample trademark image when positioning a direction, detect and calculate two pixels with a maximum distance in the contour feature line, and rotate and translate the contour feature line until a virtual straight line between the two pixels with the maximum distance is parallel to the x axis, and the pixels in the contour feature line of the image have a minimum coordinate value of 0 on the x axis. FIG. 7 illustrates an embodiment in which the virtual straight line between the two pixels with a maximum distance is used for positioning a direction.

If there are more than two pixels with a maximum distance between each other in the contour feature line of the sample trademark image when positioning a direction, the virtual straight line between two pixels with the maximum distance that can be rotated at a minimum rotating angle to be parallel to the x axis or the y axis is chosen as the reference straight line for positioning a direction.

2. The reference straight line is used to position an extracting rectangle. Firstly, the pixels in the contour feature line of the sample trademark image are detected to determine a maximum value on the x axis or the y axis in the coordinate system. A square is created by taking the maximum value as a side length, and the contour feature line of the sample trademark image is aligned to and centered on the y axis in the square. Then the square is translated so that one sideline of the square is overlapped with the x axis, and the other sideline of the square is overlapped with the y axis, as shown in the embodiment of FIG. 8.

After the positioning process above, different figurative feature information has comparability between each other, and different images have a common reference standard and a uniform comparison environment.

In addition, in other embodiments of the present disclosure, the positioning of the contour feature line of the sample trademark image can also use positioning policies different from the above. For example, a circumcircle method for the contour feature line of the sample trademark image is used to enable the circumcircle be tangent to the x axis and the y axis; and methods of circumscribing other geometrical figure for the contour feature line of the sample trademark image is used to enable the geometrical figure be tangent to the x axis and the y axis.

④ A coordinate value $G_n(x_n, y_n)$ of a pixel in the contour feature line is extracted in the coordinate system.

After positioning the direction and the extracting rectangle of the contour feature line of the sample trademark image, the coordinate values $G_n(x_n, y_n)$ of all pixels in the contour feature line are extracted in the coordinate system by taking a single pixel as a coordinate scale, wherein a subscript n represents an nth pixel. The extracted pixels include all pixels in the outer contour line and the inner contour line. Meanwhile the total number of the pixels in the contour feature line can be counted.

It should be noted that, the coordinate value $G_n(x_n, y_n)$ of each pixel in the contour feature line of the sample trademark image should be extracted based on a same standard as the positioning of the direction and the extracting rectangle, otherwise the comparability may be destroyed.

⑤ The coordinate value $G_n(x_n, y_n)$ is represented by a relative number according to a preset rule, to obtain a relative coordinate value $S_n(x_n, y_n)$.

For a plurality of images which are the same visually, as difference in size exists in different images, it is difficult to ensure the coordinate values of all the pixels in the contour line of the images being the same, even after positioning the direction and the extracting rectangle of the images, which results in difficulty in the coordinate matching between the images. In order to solve this problem, relative conversion for the coordinate values of the pixels in the contour line is performed to obtain the relative coordinate value of each pixel, which can effectively solve the coordinate matching problem under the condition that difference in size exists in different images. The coordinate value of the pixel represented by the relative number can be called as a relative coordinate value, and recorded as $S_n(x_n, y_n)$. Specifically, following is a formula for converting the coordinate value of the pixel in the contour line to the relative coordinate value:

$$\text{Relative coordinate value } S_n(x_n, y_n) = G_n(x_n/h, y_n/h).$$

wherein $x_n$ is the coordinate value of the nth pixel on the x axis in the coordinate system, $y_n$ is the coordinate value of the nth pixel on the y axis in the coordinate system, h is a side length of a maximum straight line of the extracting rectangle, and wherein the values of $x_n$ and $y_n$ in $S_n$ are represented by relative numbers (percentages), and the values of $x_n$ and $y_n$ in $G_n$ are represented by absolute numbers.

In an embodiment of the present disclosure, a coordinate of relative number is a coordinate reflected by converting the absolute coordinate value with respect to the coordinate origin, to a ratio of the absolute coordinate value to the side length of the maximum straight line of the extracting rectangle of the image.

The difference of coordinate values caused by the difference in size can be eliminated by representing the feature of the pixels in the contour feature line with the relative coordinate values, so that even there is a great difference in the sizes or scales of two images, the two images being substantially the same can be identified.

⑥ A distortion tolerance parameter of the relative coordinate value $S_n(x_n, y_n)$ is determined according to image analysis requirement.

In a practical application, it should be noted that, a range of the converting distortion tolerance should be determined reasonably during the process of converting the relative coordinate value. The distortion tolerance refers to that the relative coordinate value of the pixel will remain unchanged when the pixel is offset in any direction within the range of the distortion tolerance parameter. In an embodiment of the present disclosure, the distortion tolerance i of the relative coordinate value $S_n(x_n, y_n)$ is determined according to the image analysis requirement. After converting the coordinate value $G_n(x_n, y_n)$ of the pixel in the contour feature line to the relative coordinate value $S_n(x_n, y_n)$, the uniqueness of the sample trademark image can be distinguished according to the tiny difference between the relative coordinate values, but it may be difficult to find out a matched image when the coordinates are matched. The problem of coordinate matching of the image within the range of the distortion tolerance can be solved by using the distortion tolerance. The specific value of the distortion tolerance should be determined according to the image analysis requirement. The distortion tolerance parameter is generally a percentage, such as 1%, 2%, etc. In an embodiment of the present disclosure, the distortion tolerance parameter i is in a range of 0.5% to 10%.

⑦ The relative coordinate value $S_n(x_n, y_n)$ is rounded according to the distortion tolerance parameter and a rounding rule of "round off" (round down if less than half of the distortion tolerance parameter, round up if more than half of the distortion tolerance parameter), to obtain a rounded relative coordinate value $Z_n(x_n, y_n)$ of a pixel which has been precisely rounded by the distortion tolerance.

When the distortion tolerance parameter is 1%, the x-axis coordinate and y-axis coordinate in the relative coordinate value of the pixel should be equally divided into 100 reference relative coordinates. The relative coordinate value which does not fall into the reference relative coordinate should be rounded according to the rounding rule, so as to fall into the reference coordinates.

The rounding rule in this embodiment refers to: rounding the relative coordinate value $S_n(x_n, y_n)$ of the pixel by the rounding rule of "round off" according to the distortion tolerance parameter, to obtain a rounded relative coordinate value $Z_n(x_n, y_n)$ of the pixel which has been precisely rounded by the distortion tolerance.

The specific process of the rounding will be described with reference to the following embodiment of the present disclosure.

$S_1$(0%, 52.321%), $S_2$(0.891%, 51.567%), $S_3$(2.189%, 50.463%), $S_4$(3.986%, 49.646%), $S_5$(4.895%, 47.347%), $S_6$(6.263%, 45.396%), $S_7$(8.231%, 43.373%), $S_8$(9.172%, 41.502%), $S_9$(11.265%, 38.674%).

Embodiment One: supposing that the relative coordinate values $S_n(x_n, y_n)$ of a group of pixels in the contour feature line of the sample trademark image are obtained as below:

$S_1$(0%, 52.321%), $S_2$(0.891%, 51.567%), $S_3$(2.189%, 50.463%), $S_4$(3.986%, 49.646%), $S_5$(4.895%, 47.347%), $S_6$(6.263%, 45.396%), $S_7$(8.231%, 43.373%), $S_8$(9.172%, 41.502%), $S_9$(11.265%, 38.674%).

$Z_1$(0%, 52%), $Z_2$(0%, 52%), $Z_3$(2%, 50%), $Z_4$(4%, 50%), $Z_5$(4%, 48%), $Z_6$(6%, 46%), $Z_7$(8%, 44%), $Z_8$(10%, 42%), $Z_9$(12%, 38%).

The distortion tolerance parameter i is, for example 2%, and the rounded relative coordinate values $Z_n(x_n, y_n)$ of the above pixels which have been precisely rounded by the distortion tolerance are obtained as below by rounding the relative coordinate values $S_n(x_n, y_n)$ according to the rounding rule of "round off":

$Z_1$(0%, 52%), $Z_2$(0%, 52%), $Z_3$(2%, 50%), $Z_4$(4%, 50%), $Z_5$(4%, 48%), $Z_6$(6%, 46%) $Z_7$(8%, 44%), $Z_8$(10%, 42%), $Z_9$(12%, 38%).

⑧ The rounded relative coordinate values $Z_n(x_n, y_n)$ of the pixel which have been precisely rounded is output and stored in the sample trademark library.

In an embodiment of the present disclosure, the calculated result can be output after calculating the rounded relative coordinate value $Z_n(x_n, y_n)$ of the pixel in the contour feature line of the sample trademark image. The rounded relative coordinate values $Z_n(x_n, y_n)$ of all pixels in the contour feature line of the sample trademark image calculated above, are output in a form of data, and stored in the sample trademark image library, which can be used for the identification, matching, comparison, and analysis with the rounded relative coordinate values $Z_n(x_n, y_n)$ of other of trademark images to be identified. The similarity degree between different trademarks can be reflected by the overlapping degree of the rounded relative coordinate values $Z_n(x_n, y_n)$ of the pixels.

⑨ A subfigure segment of the sample trademark image is established image feature information of the subfigure segment is extracted.

Firstly, detect a connected domain contour line of a relatively independent section in the extracted figurative contour line of the sample trademark, that is, each array of continuous pixels is a connected domain contour line. Then divide the connected domain contour line as the subfigure segment of the sample trademark image. Finally, repeat the process of abovementioned ①-⑧, by taking the subfigure segment as a processing object, to extract the image feature information of the subfigure segment of the sample trademark image, and to obtain the relative coordinate value $s_n(x_n, y_n)$ and the rounded relative coordinate value $z_n(x_n, y_n)$ of the subfigure segment.

The process of processing the subfigure segment of the sample trademark image is described below.

1) The rounded relative coordinate values $Z_n(x_n, y_n)$ of the pixels in the contour line of the sample image are sequenced. A rule of sequencing the rounded relative coordinate values $Z_n(x_n, y_n)$ of the pixels refers to that: a first sequence is to sequence the values on the x axis in an ascending order, and a second sequence is to sequence the values on the y axis in an ascending order. A descending order or a mixture of ascending order and descending order may also be used.

2) An array of the continuous pixels is calculated and detected, that is, detecting whether there is a feature of continuity in the arrangement of the pixels. A method for detecting refers to that: adjacent pixels are detected from a pixel with a value of 0 on the x axis, wherein when the coordinate number on the x axis or the y axis of the sequenced adjacent pixels increases or decreases over one scale value, the pixel is regarded as a breaking point, and a set of pixels in front of the breaking point is a first array of continuous pixels; the adjacent pixels are further detected from a pixel following the breaking point, wherein when the coordinate number on the x axis or the y axis of the adjacent pixels increases or decreases over one scale value, the pixel is regarded as another breaking point, and a set of pixels in front of the breaking point is divided into a second array of continuous pixels; and repeat the above process until all pixels in the contour feature line have been detected.

3) Each array of continuous pixels is stored as one subfigure segment of the sample trademark image.

When some connected domain contour lines may have figurative elements which can be further divided, or a plurality of connected domain contour lines may be combined to form a relatively independent figurative element, the connected domain contour lines may be edited by a data processing operator through the device and system in this technical solution, to customize division or combination of their composition elements, thus the subfigure segments of the sample trademark image can be divided correctly.

⑩ A relative coordinate value $s_n(x_n, y_n)$ and a rounded relative coordinate value $z_n(x_n, y_n)$ extracted from the subfigure segment of the sample trademark image are output and stored.

The rounded relative coordinate values $z_n(x_n, y_n)$ of all pixels in the image contour line of the sample trademark subfigure calculated above is output in a form of data, and stored under a record of a certain trademark in the sample trademark library, which can be used for the matching, comparison, and analysis with the rounded relative coordinate values $Z_n(x_n, y_n)$ of the image of the trademark to be retrieved. The similarity degree between two images can be reflected by the overlapping degree of the rounded relative coordinate values of the pixels.

Thirdly, an image feature of the trademark to be retrieved is identified and processed, and image feature information thereof is extracted.

In an embodiment of the present disclosure, with reference to the process of "an image feature of the sample trademark is identified and processed, and image feature information thereof is extracted" of the abovementioned second step, the image feature of the trademark to be retrieved is identified and processed, and the image feature information thereof is extracted, to respectively extract the image feature information of the main figure and the subfigure segments of the trademark to be retrieved, by taking the trademark to be retrieved as a processing object.

In an embodiment of the present disclosure, the extracted image feature information mainly refers to a relative coordinate value $S_n(x_n, y_n)$ and a rounded relative coordinate value $Z_n(x_n, y_n)$ of a pixel in a contour feature line of the trademark image to be retrieved. It should be noted that the image feature information includes but is not limited to $S_n(x_n, y_n)$ and $Z_n(x_n, y_n)$. Other image feature information can also be obtained by deriving and transforming based on this image feature information, and can also be used to represent the information contained in the image itself.

Fourthly, a matching retrieval is performed by taking the image feature information of the trademark to be identified as a retrieval condition, and a sample trademark with a highest similarity degree to the image feature information of the trademark to be identified, and a corresponding trademark figurative element code (i.e., the figurative element code corresponding to the sample trademark recorded in the sample trademark library) are found out.

The main purpose of a matching check of the image feature information of trademark is to find out a trademark with the highest similarity degree and the recorded trademark figurative element code of the trademark image by the matching check of the image feature information.

In an embodiment of the present disclosure, the form of image feature information of the trademark refers to the relative coordinate value $S_n(x_n, y_n)$ and the rounded coordinate value $Z_n(x_n, y_n)$ of the pixel in the contour feature line of the trademark image. The sample trademark image with the highest similarity degree is found out by the matching check of the image feature information of the trademark.

In an embodiment of the present disclosure, the retrieval content for the trademark retrieval in the sample trademark library taking the image feature information of the trademark as a retrieval condition includes: 1) a matching check for the rounded relative coordinate value $Z_n(x_n, y_n)$, 2) an exact matching check for the subfigure segment or each array of continuous pixels of each trademark image; and 3) a check for a number of mismatched pixels of the rounded relative coordinate values $Z_n(x_n, y_n)$.

Two trademarks may be regarded as the same or the most similar trademarks, if the rounded relative coordinate values $Z_n(x_n, y_n)$ of the pixels in the contour feature lines of the two trademark images are overlapped completely, but in the case of incomplete overlap, it is indicated that only part of the pixels in the contour feature lines of the images are overlapped, and the non-overlapping part may affect the particular features of the trademarks, resulting in that the two trademarks may not be regarded as the same or the most similar trademarks.

In an embodiment of the present disclosure, the similarity degree between two trademark images is evaluated by a similarity rate of the subfigure segments or the arrays of continuous pixels of the trademark images, an overlapping rate of the rounded relative coordinate values of the pixels, and a non-overlapping rate of the rounded relative coordinate values of the pixels. The formula is as below.

Similarity degree between two images=Similarity rate of the subfigure segments or the arrays of continuous pixels of the trademark images*weight of the subfigure segments of the trademark images+Overlapping rate of the rounded relative coordinate values*weight of the overlapped rounded relative coordinate values+Non-overlapping rate of the rounded relative coordinate values of the pixels*weight of the non-overlapped rounded relative coordinate values.

The weight parameters are determined according to image analysis requirement, and the weight is generally in a range of 5% to 60%.

The calculation of each variable in the formula above is described below a) The similarity rate of the subfigure segment or the array of continuous pixels of the trademark image is calculated.

The similarity rate of the subfigure segments or the arrays of continuous pixels of the trademark images is calculated according to the following processing steps.

In a first step, each array of continuous pixels divided in the image contour line of the trademark to be identified is compared with each array of continuous pixels divided in the image contour line of the sample trademark, to find out matched arrays.

In a second step, the similarity rate of the arrays of continuous pixels is calculated according to the following calculation formula:

Similarity rate of the subfigure segments or the arrays of continuous pixels=(a first matched array of continuous pixels+a second matched array of continuous pixels+a third matched array of continuous pixels+ . . . +an nth matched array of continuous pixels)/a total number of pixels of the relative coordinate values in this image*100%.

b) The overlapping rate of the rounded relative coordinate values of pixels is calculated.

The matching between the rounded relative coordinate values $Z_n(x_n, y_n)$ of the pixels in the contour feature line of the trademark image to be identified is checked with the rounded relative coordinate values $Z_n(x_n, y_n)$ of the pixels in the contour feature line of the sample trademark image one by one, and the number of the overlapping and matching rounded relative coordinate values is counted. And then the overlapping rate is calculated according to the following formula:

Overlapping rate=(Number of the overlapping rounded relative coordinate values $Z_n(x_n, y_n)$/ Total number of the pixels in the contour feature line of the trademark image to be identified)*100%.

When the overlapping rate is equal to 100%, it can be confirmed that the two trademarks are the same. When the overlapping rate is less than 100%, it can be confirmed that part of the contour feature line of the trademark to be identified is the same as that of the sample trademark.

c) The non-overlapping rate of rounded the relative coordinate values of the pixels is calculated.

The relative coordinate values of most pixels in the trademark images may not overlap during the matching and comparison process between the two trademarks. The impact of the rounded relative coordinate values $Z_n(x_n, y_n)$ of the non-overlapping pixels on the similarity degree between the two trademark images should be considered in the matching process. In an embodiment of the present disclosure, the non-overlapping rate of the relative coordinate values of the pixels is used for evaluation according to the following calculation formula:

Number of non-overlapped relative coordinate values of pixels=Total number of the rounded relative coordinate values $Z_n(x_n, y_n)$ of the pixels in the image contour line of the trademark to be identified−Number of the overlapped rounded relative coordinate values $Z_n(x_n, y_n)$, and Non-overlapping rate=(Number of non-overlapped relative coordinate values of the pixels/Total number of the pixels in the image contour line of the trademark to be identified)*100%.

The sample trademark with a highest similarity degree and the recorded trademark figurative element code are found out based on the matching of the image feature information and the evaluation on the similarity degree.

Fifth, the trademark figurative element code corresponding to the sample trademark is output as a figurative element code of the trademark to be identified.

A sample trademark image with a highest similarity degree of the image feature information is found out by the matching check between the image feature information of the main figure and subfigure segments of the trademark to be identified and the image feature information of the main figure and subfigure segments of the sample trademark. Particularly, when the similarity degree reaches to 100%, it can be confirmed that the two trademark images are the same trademark. When the similarity degree is close to 100%, it can be confirmed that the two trademark images are the highly similar trademarks. Thus, the recorded trademark figurative element coded corresponding to the sample trademark with a highest similarity degree found out above can be regarded as the figurative element code of the trademark to be identified and be output, to be used in the trademark retrieval system according to an embodiment of the present disclosure.

Figure 9:
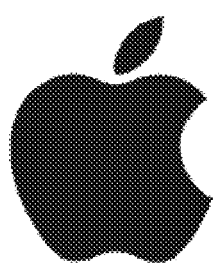
FIG. 9 is a diagram illustrating original images of some exemplary images according to another embodiment of the present disclosure.
Figure 9:
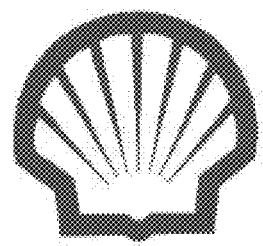
Figure 9:
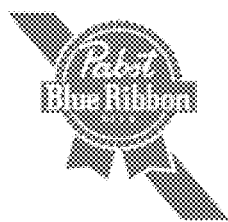
Figure 9:
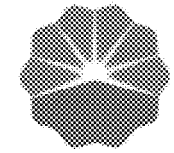
Figure 10:
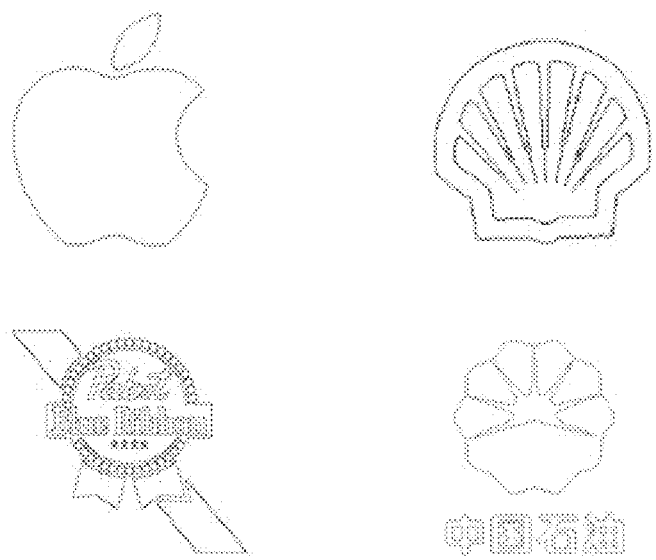
FIG. 10 is a diagram illustrating exemplary contour feature lines according to another embodiment of the present disclosure.

Original images of four figurative trademarks of Apple, Shell, Blue Ribbon and PetroChina shown in FIG. 9 and FIG. 10 are taken as examples in an embodiment of the present disclosure. By means of the process in an embodiment of the present disclosure, sample trademarks with a highest similarity degree are found out in the sample trademark data library, which respectively are, a figurative trademark No. 167364, a figurative trademark No. 180720, a figurative trademark No. 559294 of BLUE RIBBON, and a figurative trademark No. 4360587 of PetroChina. The figurative element codes of the four figurative trademarks are listed below:

the figurative element code of the figurative trademark No. 167364 of Apple: 5.7.13;

the figurative element code of the figurative trademark No. 180720 of Shell: 3.8.18;

the figurative element code of the figurative trademark No. 559294 of Blue Ribbon: 24.5.20; 25.1.6; and the figurative element code of the figurative trademark No. 436587 of PetroChina: 1.3.1; 25.1.25; 29.1.13; 5.5.20; and A1.3.15.

The embodiment of the present disclosure is described above by taking the retrieval application of trademark retrieval as an example. Actually, the technical solution of the present disclosure can also be used in other similar applications.

1. For example, in a retrieval application of a design patent application, the above trademark image can be modified or replaced with an image of the design, and the trademark figurative element code can be modified or replaced with a code in the *International Classification for Industrial Designs*; and 2. For another example, in a retrieval application of the same or similar commodity, the above trademark image can be modified or replaced with an image of the commodity, and the trademark figurative element code can be modified or replaced with a code of the commodity.

In one embodiment of the present disclosure, a device for automatically dividing trademark figurative element codes is provided, including:

a sample trademark library establishing module, configured to establish a sample trademark library and establish a corresponding relationship between sample trademarks and division data for figurative element codes of known filed/registered figurative trademarks;

a sample trademark image feature information extraction module, configured to extract and process image feature information of the sample trademarks, and establish a corresponding relationship between the sample trademarks and the extracted image feature information;

an image feature information extraction module for a trademark to be identified, configured to extract and process image feature information of a trademark to be identified;

a matching retrieval module, configured to perform a matching retrieval by taking the image feature information of the trademark to be identified as a retrieval condition, and find out a sample trademark with a highest similarity degree to the image feature information of the trademark to be identified, and a corresponding trademark figurative element code; and a figurative element code outputting module, configured to output the trademark figurative element code corresponding to the sample trademark as a figurative element code of the trademark to be identified.

In a specific example, the sample trademark library establishing module may include: a figurative element code recording sub-module, configured to record figurative element codes of the sample trademarks in the sample trademark library with the division date for figurative element codes of known filed/registered figurative trademarks.

The sample trademark image feature information extraction module and the image feature information extraction module for the trademark to be identified may respectively include:

a trademark preprocessing sub-module, configured to preprocess the trademark by at least one of graying, binarization, and denoising;

a contour feature line extraction sub-module, configured to extract a contour feature line of the preprocessed trademark image, wherein the contour feature line includes a set of pixels in an edge, a set of pixels in an outer contour line, and a set of pixels in an inner contour line of the trademark image;

a contour feature line positioning sub-module, configured to position a direction and an extracting rectangle of the contour feature line in a coordinate system, wherein the coordinate system is constructed by taking a single pixel of the image as a measurement unit on an x axis and a y axis;

a pixel coordinate value extraction sub-module, configured to extract a coordinate value $G_n(x_n, y_n)$ of a pixel in the contour feature line in the coordinate system, wherein, a subscript n represents an nth pixel, a relative coordinate value obtaining sub-module, configured to represent the coordinate value $G_n(x_n, y_n)$ by a relative number according to a preset rule, to obtain a relative coordinate value $S_n(x_n, y_n)$, wherein values of $x_n$ and $y_n$ in $S_n$ are represented by relative numbers (percentages), and values of $x_n$ and $y_n$ in $G_n$ are represented by absolute numbers;

a rounded relative coordinate value obtaining sub-module, configured to round the relative coordinate value $S_n(x_n, y_n)$ according to a preset distortion tolerance parameter and a rounding rule of "round off" (round down if less than half of the distortion tolerance parameter, round up if more than half of the distortion tolerance parameter), to obtain a rounded relative coordinate value $Z_n(x_n, y_n)$;

a coordinate value data outputting and processing sub-module, configured to output and store the obtained relative coordinate value $S_n(x_n, y_n)$ and rounded relative coordinate value $Z_n(x_n, y_n)$;

a subfigure segment establishing sub-module, configured to establish a subfigure segment of the trademark image; and an image feature information extraction sub-module, configured to extract and process image feature information of the subfigure segment, to obtain a relative coordinate value $s_n(x_n, y_n)$ and a rounded relative coordinate value $z_n(x_n, y_n)$ of the subfigure segment.

In this case, the image feature information may be key feature information of the trademark image, which includes the coordinate value $G_n(x_n, y_n)$, the relative coordinate value $S_n(x_n, y_n)$ and the rounded relative coordinate value $Z_n(x_n, y_n)$ of the pixel in the contour feature line of the trademark image extracted after the positioning. On the other hand, the image feature information may also include framework feature information, shape feature information and/or template feature information extracted by a known device for image key feature information extraction.

In a specific example, the matching retrieval module may include at least one of:

a first retrieval sub-module, configured to retrieve a rounded relative coordinate value $Z_n(x_n, y_n)$ in a contour feature line of a trademark image;

a second retrieval sub-module, configured to retrieve each array of continuous pixels in a contour feature line of a trademark image or information of subfigure segment of a trademark image; and a third retrieval sub-module, configured to retrieve a number of mismatched pixels of the rounded relative coordinate values $Z_n(x_n, y_n)$ in a contour feature line of a trademark image.

In a specific example, the positioning of the direction and the extracting rectangle performed by the contour feature line positioning sub-module may include: translating the contour feature line extracted by the contour feature line extraction sub-module without changing a rotating direction, to a position where the pixels in the contour feature line have a minimum coordinate value of 0 on the x axis, and the pixels in the contour feature line have a minimum coordinate value of 0 on the y axis, and wherein, the extracting rectangle is a circumscribed square of the contour feature line.

In another specific example, the positioning of the direction performed by the contour feature line positioning sub-module may include: finding out a longest straight line in the contour feature line, rotating the contour feature line at a minimum rotating angle so that the longest straight line in the contour feature line being parallel to the x axis or the y axis, and translating to a position where the pixels in the contour line have a minimum coordinate value of 0 on the x axis and the contour feature line is aligned to and centered on the y axis inside the extracting rectangle.

In another specific example, the positioning of the extracting rectangle performed by the contour feature line positioning sub-module may include: creating a square by taking a maximum coordinate value on the x axis or the y axis in the positioned contour feature line as a side length, and wherein one sideline of the square is overlapped with the x axis, and another sideline of the square is overlapped with the y axis.

The relative coordinate value obtaining sub-module may obtain the relative coordinate value $S_n(x_n, y_n)$ by calculating a formula as below:

Relative coordinate value $S_n(x_n, y_n)=G_n(x_n/h, y_n/h)$, wherein $x_n$ represents the coordinate value of the nth pixel on the x axis in the coordinate system, $y_n$ represents the coordinate value of the nth pixel on the y axis in the coordinate system, h represents a side length of a maximum straight line of the extracting rectangle, wherein the values of $x_n$ and $y_n$ in $S_n$ are represented by relative numbers (percentages), and the values of $x_n$ and $y_n$ in $G_n$ are represented by absolute numbers.

In a specific example, the rounded relative coordinate value $Z_n(x_n, y_n)$ may be obtained by converting the relative coordinate value $S_n(x_n, y_n)$ by the rounded relative coordinate value obtaining sub-module according to the distortion tolerance parameter and the rounding rule, and wherein the values of $x_n$ and $y_n$ in $Z_n$ are represented by relative numbers (percentages).

According to the above method for automatically dividing trademark figurative element codes and the device for automatically dividing trademark figurative element codes, a system for automatically dividing trademark figurative element codes is also provided in an embodiment of the present disclosure. The system includes a memory and a server wherein the memory and the server are configured to perform the following operations:

establishing a sample trademark library and establishing a corresponding relationship between sample trademarks and division data for figurative element codes of known filed/registered figurative trademarks;

extracting and processing image feature information of the sample trademarks, and establishing a corresponding relationship between the sample trademarks and the extracted image feature information;

extracting and processing image feature information of a trademark to be identified;

performing a matching retrieval by taking the image feature information of the trademark to be identified as a retrieval condition, and finding out a sample trademark with a highest similarity degree to the image feature information of the trademark to be identified, and a corresponding trademark figurative element code; and outputting the trademark figurative element code corresponding to the sample trademark as a figurative element code of the trademark to be identified.

It can be understood by those skilled in the art that, the specific technical implementations of the device and system for automatically dividing trademark figurative element codes are the same as the above implementations of the method for automatically dividing trademark figurative element codes. All or part of the processes in the above method in the embodiment of the present disclosure can be achieved by relevant hardware instructed by a computer program. The program can be stored in a computer readable storage medium. When the program is executed, the processes in the embodiments of the above methods are included. The storage medium may be a magnetic disk, an optical disc, a read-only memory (ROM), a random access memory (RAM) and so on. Thus, according to the solution of the embodiment of the present disclosure, a storage medium containing a computer readable program is further provided in the present disclosure. When the computer readable program in the storage medium is executed, any one of the above methods for automatically dividing trademark figurative element codes in the present disclosure may be realized.

Hereinabove, the technical solution of the present disclosure has been described in detail with reference to the specific embodiments. The described specific embodiments are used to help understand the concept of the present disclosure. Derivations and modifications made by those skilled in the art based on the specific embodiments of the present disclosure also belong to the protective scope of the present disclosure.

What is claimed is:

1. A method for automatically dividing trademark figurative element codes, comprising:

S101, establishing a sample trademark library and establishing a corresponding relationship between sample trademarks and division data for figurative element codes of known filed/registered figurative trademarks;

S102, extracting and processing image feature information of the sample trademarks, and establishing a corresponding relationship between the sample trademarks and the extracted image feature information, specifically including extracting coordinate values $(x_n, y_n)$, relative coordinate values $(x_n', y_n')$ and rounded relative coordinate values $(x_n'', y_n'')$ of pixels in a contour feature line of a sample trademark image to obtain the image feature information of the sample trademark, wherein $x_n$ represents a coordinate value of an $n^{th}$ pinxel on an x axis in a coordinate system, $y_n$ represents a coordinate value of the $n^{th}$ pixel on a y axis in the coordinate system;

S103, extracting and processing image feature information of a trademark to be identified, specifically including extracting coordinate values $(x_n, y_n)$, relative coordinate values $(x_n', y_n')$ and rounded relative coordinate values $(x_n'', y_n'')$ of pixels in a contour feature line of a trademark image to be identified to obtain the image feature information of the trademark to be identified;

S104, performing a matching retrieval by taking the image feature information of the trademark to be identified as a retrieval condition, and finding out a sample trademark with a highest similarity degree to the image feature information of the trademark to be identified, and a corresponding trademark figurative element code, specifically including performing the matching retrieval in the sample trademark library by taking the image feature information of the rounded relative coordinate values $(x_n'', y_n'')$ of the pixels in the contour feature line of the trademark image to be identified as a retrieval keyword, and for each sample trademark respectively finding out a number of pixels matched with the rounded relative coordinate values $(x_n'', y_n'')$ of the pixels in the contour feature line of the trademark image to be identified and a number of pixels mismatched with the rounded relative coordinate values $(x_n'', y_n'')$ of the pixels in the contour feature line of the trademark image to be identified, to find out the sample trademark with a highest similarity degree to the image feature information of the trademark to be identified, and the corresponding trademark figurative element code;

S105, outputting the trademark figurative element code corresponding to the sample trademark with a highest similarity degree to the image feature information of the trademark to be identified as a figurative element code of the trademark to be identified, wherein a similarity degree between two trademark images is obtained using the following formula:

Similarity degree between two trademark images=Similarity rate of subfigure segments or arrays of continuous pixels of the two trademark images*weight of the subfigure segments of the two trademark images+Overlapping rate of the rounded relative coordinate values of the pixels*weight of overlapped rounded relative coordinate values+Non-overlapping rate of the rounded relative coordinate values of the pixels*weight of non-overlapped rounded relative coordinate values.

2. The method according to claim 1, wherein the establishing a corresponding relationship between sample trademarks and division data for figurative element codes of known filed/registered figurative trademarks in S101 includes: recording figurative element codes of the sample trademarks in the sample trademark library with the division data for figurative element codes of known filed/registered figurative trademarks.

3. The method according to claim 1, wherein the extracting and processing image feature information of the trademark in S102 and S103 includes:

① preprocessing the trademark by at least one of graying, binarization, and denoising;

② extracting a contour feature line of the preprocessed trademark image, wherein the contour feature line includes a set of pixels in an edge, a set of pixels in an outer contour line, and a set of pixels in an inner contour line of the trademark image;

③ positioning a direction and an extracting rectangle of the contour feature line in the coordinate system, wherein the coordinate system is constructed by taking a single pixel of an image as a measurement unit on an x axis and a y axis;

④ extracting coordinate values $(x_n, y_n)$ of pixels in the contour feature line in the coordinate system, wherein a subscript n represents an nth pixel;

⑤ representing the coordinate values $(x_n, y_n)$ by a relative number according to a preset rule, to obtain relative coordinate values $(x_n', y_n')$, wherein values of $x_n'$ and $y_n'$ are represented by relative numbers (percentages), and values of $x_n$ and $y_n$ are represented by absolute numbers;

⑥ rounding the relative coordinate values $(x_n', y_n')$ according to a preset distortion tolerance parameter and a rounding rule of "round off", to obtain rounded relative coordinate values $(x_n'', y_n'')$;

⑦ establishing a subfigure segment of the trademark image; and

⑧ extracting and processing image feature information of the subfigure segment, to obtain relative coordinate values $(x_n', y_n')$ and rounded relative coordinate values $(x_n'', y_n'')$ of the subfigure segment.

4. The method according to claim 3, wherein the image feature information further includes framework feature information, shape feature information and/or template feature information extracted by a known method for image key feature information extraction.

5. The method according to claim 3, wherein the performing a matching retrieval by taking the image feature information of the trademark to be identified as a retrieval condition in S104, includes at least one of:

retrieving the rounded relative coordinate values $(x_n'', y_n'')$ in the contour feature line of the trademark image;

retrieving each array of continuous pixels in the contour feature line of the trademark image or information of subfigure segment of the trademark image; and retrieving the number of pixels mismatched with the rounded relative coordinate values $(x_n'', y_n'')$ in the contour feature line of the trademark image.

6. The method according to claim 3, wherein the positioning of the direction and the extracting rectangle includes, translating the contour feature line extracted in the step ② without changing a rotating direction, to a position where the pixels in the contour feature line have a minimum coordinate value of 0 on the x axis, and the pixels in the contour feature line have a minimum coordinate value of 0 on the y axis, and wherein the extracting rectangle is a circumscribed square of the contour feature line.

7. The method according to claim 3, wherein the positioning of the direction includes: finding out a longest straight line in the contour feature line, rotating the contour feature line at a minimum rotating angle so that the longest straight line in the contour feature line is parallel to the x axis or the y axis, and translating the contour feature line to a position where the pixels in the contour line have a minimum coordinate value of 0 on the x axis and the contour feature line is aligned to and centered on the y axis inside the extracting rectangle.

8. The method according claim 3, wherein the positioning of the extracting rectangle includes: creating a square by taking a maximum coordinate value on the x axis or the y axis in the contour feature line positioned in the step ③ as a side length, and wherein one sideline of the square is overlapped with the x axis, and the other sideline of the square is overlapped with the y axis.

9. The method according to claim 3, wherein the relative coordinate values $(x_n', y_n')$ are calculated by a formula as below:

Relative coordinate values $(x_n', y_n')=(100\% *x_n/h, 100\%*y_n/h)$, h represents a side length of a maximum straight line of the extracting rectangle.

10. The method according to claim 3, wherein values of $x_n''$ and $y_n''$ are represented by relative numbers (percentages).

11. A non-transitory, computer-readable storage medium containing a computer-executable program, wherein when the program is executed by a computer, the method for automatically dividing trademark figurative element codes of claim 1 is performed.

* * * * *